United States Patent Office 3,414,547
Patented Dec. 3, 1968

3,414,547
POLYMERIZATION PROCESS
Ralph B. Thompson, Hinsdale, and Myron J. Jursich, Chicago, Ill., assignors to Nalco Chemical Company, Chicago, Ill., a corporation of Delaware
No Drawing. Filed June 13, 1963, Ser. No. 287,476
16 Claims. (Cl. 260—78.5)

This invention relates to an improved polymerization process. More specifically, the instant invention is concerned with a polymerization method whereby the starting monomer content in the final polymeric product is reduced to negligible amounts, and almost completely utilized in formation of the polymer itself.

With ever increasing use of polymeric substances as additives in a wide variety of process applications, efforts have been devoted to preparing these polymeric substances in such a manner that all starting monomeric reactants are completely used up in formation of the product. Many problems arise in having minor amounts of unreacted starting monomer present in the final useful polymeric product. For example, one of the most serious problems is that of product toxicity. In the majority of cases, the monomer itself is many-fold more toxic than the polymer end product. Thus, when the polymer is employed in such roles as a coagulant, papermaking additive, boiler treating agent, etc., there is a possibility that carryover of the monomer substance to consumer goods may occur, especially where the monomer is present in relatively large amounts. Efforts are being constantly devoted therefore to produce polymers having substantially no monomer contaminant content, which may possibly be injurious to individuals, if the undesirable monomer is carried through to industrial, agricultural or other process operations.

Other problems arise if starting monomer reactant material is not completely consumed in the polymerization reaction. For example, in the vast majority of cases only the polymer shows effectiveness in its particular additive role, with the monomer being at best a mere diluent and inactive in promoting the desired additive aim. In fact, in some cases if unreacted monomer is present along with the polymer material, actual interference with the efficiency and effectiveness of the polymer may occur, and the polymer additive performance may be reduced in direct proportion to amount of monomer impurity present. The monomer may even so interfere with the purpose of polymer addition, that the polymer may become ineffectual in use. Resort then must be had to other polymeric systems in which the monomer content has been reduced to an acceptable minimum.

Another disadvantage of incomplete utilization of starting monomer material, is that such a situation leads to increasing costs, and loss of process manpower and hours. Chemical cost of the polymer product may in some cases be 10–20% higher than it would if all the monomer were reacted and consumed in forming the chain polymeric molecules. Attempts to obviate the problem by purification of the polymer make the overall polymerization process unattractive in that longer process times, and a number of otherwise unnecessary multiple process steps are created.

Attempts to drive the polymerization reaction to completion have been in most cases completely or partially ineffectual. This is particularly true in addition polymerization techniques. Most attempts to overcome this unreacted monomer content problem have merely resulted in producing a completely unusable cross-linked, gel material. Yet in many additive processes, water-soluble polymers having essentially linear chains are absolutely essential in order to achieve the requisite effectiveness in treating various aqueous media. For example, in treating a paper mill process stream with a polymer whose function is to increase filler and paper fines retention on the former paper sheet, for best effectiveness the polymer must be compatible with water in order to reach the surface of the pulp fibers and make it more attractive to the fillers and small fiber fines. Practically the same situation is present in a process of removal of inorganic or organic solids suspended in waste waters or other aqueous media. In order to purify the water and/or recover the contaminants contained therein, it is necessary that the agglomerating or coagulating agent have the requisite water dispersibility or solubility whereby it can be uniformly mixed with the impure water containing suspended solids and perform its desired role quickly and efficiently. Gel materials are then completely useless for such above roles, and also for a myriad of other processes involving treatment of aqueous media.

It has been experienced that merely increasing the amounts of catalyst employed in promoting polymerization of the addition type polymers merely either results in gelation problems, or decrease in molecular weight, or at the very least, discoloration of the subsequently formed polymer. Also, increasing the amounts of catalyst used in some cases creates an undesirable increased number of radical sites, so that frequently the overall chain length is substantially cut down as a numerical average with resultant decreased average molecular weight of the polymer. This is often undesirable, since it is generally accepted that for many additive roles increased molecular weight is directly proportional to the effectiveness of the polymer in achieving its desired aim. The same type of problems are created by attempts to drive the polymerization reaction to its full extent by increasing the heat of reaction. Again, it is generally felt that a slow, controlled polymerization reaction run at relatively low temperatures leads to a better polymeric product having the requisite long chain length and concomitant desired high molecular weight.

Many attempts to purify the polymer and separate it from the starting monomer reactant have generally been fruitless or at best impractical. It is known, that in most instances the unreacted monomer cannot readily be separated from the polymer due to their similar inherent chemical and physical characteristics. At the very least, obtrusive multi-step chemical techniques must be employed such as salting-out, ultra-centrifugation etc. If attempts are successful to separate the undesired unreacted monomer from the polymer, attempted re-use of the unreacted monomer and subsequent polymerization thereof is likely to be unsuccessful for a wide variety of reasons.

It would therefore be of substantial benefit to the art if a reaction were devised whereby unreacted monomer at the termination of the polymerization could be reduced to minimal proportions. If such a polymerization process could be adapted to a wide variety of different addition-type monomers and a number of various polymerization techniques, such a method would find ready acceptance in the art. More particularly, if the polymerization reaction itself could still be carried out in a one-step method without resort to extraneous, separate multi-step polymer product refining, such a technique would be extremely desirable. Other advantages would accrue if the method did not cause gelation, discoloration, or other undesirable side effects, and could be carried out in such a manner that high molecular weight, water-soluble polymers of essentially linear character could be produced. In particular, if such a method were available whereby unreacted monomer content were substantially reduced to a fraction of a percent and could be adapted to solution, bulk, emulsion, suspension, etc., polymerizations of both water-soluble and water-insoluble products, the method would be a substantial advance in the art and achieve many desired goals with obviation of the above discussed problems.

In view of the above it therefore becomes the object of the invention to provide an improved polymerization technique whereby unreacted starting monomer content is reduced to a negligible amount.

Another object of the invention is to produce addition-type polymers through a wide variety of known polymerization techniques whereby both water-soluble and water-insoluble polymers are produced which have little, if any, unreacted monomer present as contaminant substances.

A special object of the invention is to produce by a specific method, water-soluble high molecular weight, addition polymers of a substantially linear nature, which can be subsequently employed in a number of processes involving treatment of aqueous media without danger of side effects from monomer reactants normally present in prior art polymer produced via prior known techniques.

Other objects will appear hereinafter.

In accordance with the invention a batch polymerization method has been discovered whereby the starting monomer content present at the termination of the polymerization, may be reduced to an extent heretofore impossible to achieve without complicated techniques. In its broadest aspects, this method of polymerizing all but minute amounts of original monomer reactant, comprises the steps of forming a reaction mixture of one or more monomers containing at least one ethylenically unsaturated group capable of addition polymerization, adding thereto a catalyst capable of producing free radicals to initiate polymerization of the monomer or monomers, and then allowing polymerization to occur in the presence of this free radical producing catalyst. At a time when at least one-half of the exotherm of the above polymerization reaction has occurred, i.e., the self-sustained portion of the polymerization reaction which maintains its heat of reaction due to spontaneous polymerization, an organic azo catalyst is added to the partially polymerized monomer. Then, the post-polymerization reaction step is carried out in the presence of the azo catalyst whereby starting monomer content is substantially reduced at termination of this step. The second or post-polymerization step of the overall reaction may be carried out as a continuous operation immediately following the initial polymerization, or else the initial polymerization reaction step may be followed by isolation of the mixture of polymer and unpolymerized monomer mixture, usually a solid, which is then further reacted in the presence of the organic azo catalyst. This process is further characterized as being conducted in a manner whereby the monomer compositions are only added at the initiation of the polymerization reaction.

In many conventional polymerization methods it is difficult or impossible to reduce unreacted original monomer content much below about 5%, and virtually impossible to achieve reduction below about 2% without effecting multi-step sophisticated process techniques. The instant invention is a facile method of reducing monomer content below about 2% by weight of the original monomer present, without resort to a number of costly time consuming steps or extremely complicated process variants.

The initial polymerization or "pre-polymerization" step may be carried out by any desired prior art technique, as for example, by bulk, solution, emulsion, suspension, etc., polymerization methods. Likewise, any monomer containing at least one ethylenic group capable of addition polymerization may be employed as a sole monomer reactant in a homo-polymerization, or two or more different monomers may be inter-polymerized to produce copolymers, terpolymers, etc. It is preferred that this initial polymerization be carried out in the presence of some water-soluble or organic solvent, since it is known that bulk type polymerizations in contradistinction to those carried out with dilution, are difficult to control, and often produce only low molecular weight polymers and/or gelled masses unusable for their particular additive purposes. The most preferred initial polymerization is one carried out in the presence of water as a diluent, with or without surfactants to achieve emulsion or suspension.

Any one or more ethylenically unsaturated monomers may be employed to produce homo- or interpolymers. Examples of such monomers are acrylic acid and salts and alkyl esters thereof, vinyl pyrrolidone, vinyl acetate, methacrylamide, vinyl alkyl ethers such as methyl vinyl ether, methacrylic acid and salts and alkyl esters thereof, acrylonitrile, methacrylonitrile, allyl alcohol, allyl amine, acrylamide, maleic acid, maleic anhydride, fumaric acid, vinyl pyridine, vinyl chloride, methyl methacrylate, chlorotrifluoroethylene, vinylidine fluoride, tetrafluoroethylene, styrene, ethylene, beta-diethylaminoethyl methacrylate, vinyl trimethylacetate, butadiene, vinyl fluoride, methyl isobutyrate, cyclohexyl methacrylate, vinyl laurate, vinyl chloroacetate, vinyl stearate, N-vinyl imides, N-vinyl lactams, methyl vinyl ketone, diethylene glycol dimethacrylate, diethylene glycol diacrylate, diallylmaleate, allyl methacrylate, diallyl phthalate, diallyl adipate, divinyl adipate, etc.

Starting monomers which are most preferred from the standpoint of being easily converted by polymerization whereby their starting monomer reactant levels are reduced to below 2% by weight of original monomer at the termination of the post-polymerization reaction, are those monomers which are water-soluble and have at least one ethylenically unsaturated group capable of addition polymerization, and which also contain as a side chain, a hydrophilic group selected from the class consisting of carboxylic acids, carboxylic acid anhydride, carboxylic acid amide, hydroxy, pyridine, pyrrolidone, hydroxy alkyl ether, alkoxy, and carboxylic acid salt groups. By use of the term "water-soluble" it is intended to include not only those substances which are soluble in all proportions with water, but also to include monomers which may have low solubility, but nevertheless may be dispersed or emulsified in water by suitable techniques.

In the pre-polymerization reaction step, one or more of the above or other representative ethylenically unsaturated monomers are made up as starting reactant monomers in any suitable sized batch. Preferred polymerization reactions are then carried out preferably in the presence of some organic or water-soluble solvent, and most preferably in water itself. After a suitable solution, dispersion or suspension has been composed, a free radical yielding catalyst is added to initiate the reaction. Of those that may be employed the following are representative; benzoyl peroxide, hydrogen peroxide, potassium persulfate, potassium permanganate, methyl cyclohexyl peroxide, alkali perborates, diacetyl peroxide, tertiary butyl hydroperoxide, tertiary amyl hydroperoxide, di-tertiary butyl peroxide, acetyl benzoyl peroxide, cumene hydroperoxide, tertiary butyl peracetate, tertiary butyl perbenzoate, tertiary butyl percarbonate, and the like. The amount of catalyst used in the pre-polymerization process may vary from 0.003% to about 0.2% by weight of the monomer or monomers present. The preferred range is from about 0.003% to about 0.05%.

In a preferred embodiment the polymerization reaction is carried out using a redox type catalytic system. In such a method, either avoiding presence of oxygen or removal of oxygen by some means is preferred in order to permit the catalyst to form free radicals. In a redox system, the catalyst is activated by means of a reducing agent, which in the absence of oxygen immediately produces free radicals without the use of heat, or with very mild heating. One of the reducing agents most commonly used is sodium metabisulfite. Other suitable agents include water-soluble thiosulfates, bisulfites, hydrosulfites, and reducing salts, such as the sulfates of metal which are capable of existing in more than one valence state. This metal may include cobalt, iron, nickel, copper, etc. The use of a redox initiator system has several advantages, the most important of which is that it is possible to carry out polymerization at lower temperatures.

After the catalyst and activator, if desired, are added to the ethylenically unsaturated monomer, polymerization begins after intimate contact has been effected between catalyst and monomer. Preferred catalysts for use in the pre-polymerization step are redox catalyst such as alkali metal persulfates and peroxidic catalysts such as tertiary butyl peroxide. These groups of catalyst possess sufficient radical inducing strength to promote further desired chain growth by introducing new radical sites on already formed polymeric chains rather than preferentially causing initiation of new chains. Preferential initiation of new chains generally is believed to lead to low average molecular weight of polymer products.

It is preferred to remove air from the system and maintain a blanket of inert gas during the reaction. A simple method of achieving the deaeration is to simply evacuate the system with a vacuum pump and then introduce a gas such as nitrogen, carbon dioxide, etc., slowly into the reaction vessel. This first step or pre-polymerization reaction may be carried out over a wide range of temperatures, though it is preferred that the temperature range be from 30 to 100° C., and more preferably from 40 to 80° C. Again, the reaction time may vary according to the particular catalyst employed and/or monomer or monomers used as reactants. Generally, however, the reaction time including time required for the exotherm to have occurred, varies from ¼ hour to 8 hours and more preferably from ½ to 5 hours duration.

By merely following the pre-polymerization techniques described above or other known prior art methods of polymerization, it is possible only to achieve polymerization to a certain maximum extent in terms of unreacted monomer. Generally, the residual monomer content after such prior art polymerization remains at about 5%. Efforts to drive the reaction to completion and reduce monomer content below this amount, and particularly below about 2% are generally ineffectual, and may result in cross-linking the linear polymer to produce unusuable resinous masses. Maximizing efficiency of the polymerization by proper adjustment of time, temperature, monomer concentration, catalyst amount and type, etc., to their respective optimum values, still does not help to achieve nearly theoretically complete polymerization as is desired in many cases.

A special technique then is needed to substantially reduce monomer content and preferably below about 2.0% by weight of original monomer content. This technique which, for simplicity sake, will be called a "post-polymerziation reaction" forms the essence of the invention, and will be described in more detail below. In its most general aspects, such post-polymerization reaction is a continuation of the above pre-polymerization reaction step after at least one half the exotherm of that initial addition polymerization reaction has occurred. The post-polymerization reaction is one carried out in the presence of an azo catalyst. This catalyst may either be added to the partially polymerized reaction mixture without previous work-up or purification, and the further polymerization effected. Or the partially polymerized monomer may be isolated as a solid mixture of polymer and unreacted monomer, and subsequently treated in a separate process step with the azo catalyst, and thereby polymerized to the desired extent.

It is preferred that at least 0.001% of azo catalyst based on the weight of the origial monomer present be added to effect the post-polymerization reaction step. Most preferebaly from 0.001 to 1.0% by weight of azo catalyst is added. For best results, and most complete polymerization, it is preferred that the exothermic reaction of the initial or pre-polymerization step be completed prior to addition of the azo catalyst. After this exotherm has ceased, one may add the azo catalyst any time thereafter, but for most practical results in conversion of monomer into polymer it is preferred that the post-polymerization azo catalyst be added at least ¼ hour after the exotherm of the initial polymerization has ceased and most preferably between ¼ hour and 1 hour thereafter.

In essence, the primary essential as to timing of azo catalyst addition, is that it be started only after the first prior art conventional polymerization reaction is given sufficient time as measured from the beginning of the exotherm, so that the desired extent of the pre-polymerization takes place. This, as mentioned above, occurs when at least one-half of the time of the exotherm step has already occurred.

The post-polymerization reaction step itself may be carried out using a wide range of reaction times and over considerable ranges of temperature. However, for best results the reaction is carried out for at least ¼ hour at a temperature of at least 30° C., and most preferably from ¼ hour to 5 hours at temperatures ranging from 40° C., to 90° C. Again, it is preferred that the post-polymerization reaction be carried out in the absence of oxygen and in the presence of an inert gas such as nitrogen and the like, though such is not essential. The required time of the post-polymerization step may also be measured in time sufficient to reduce the monomer content below a certain desired figure. If, for example, one desires the monomer content to be below about 2.0% by weight of original monomer present, the post-polymerization reaction step is merely carried out for a period of time sufficient to reduce the free monomer content to this level. The reaction itself may be monitored and free monomer content periodically determined by such analytical methods as titration and the like.

It has been noted that other catalysts do not possess the property of the organic azo catalyst to substantially reduce unreacted monomer content of a partially polymerized mixture. Unexpectedly, only such azo compounds have the ability to reduce monomer content to the desired level by subsequent polymerization of unreacted monomer to preferably below about 2.0% by weight. Attempts to use other catalysts have merely resulted in either little reduction of free monomer content or cross-linking of the polymer to a gelled mass.

It is thought that the reason for the success of the azo catalyst in promoting substantially complete polymerization is attributed to its intermediate "strength" of free radical generation. That is, the azo catalyst is sufficiently reactive in promoting free radical sites on unreacted monomer, but nevertheless does not have sufficient activity or strength to produce sites on already formed polymer, thereby greatly enhancing chances for cross-links and subsequent gelation by chemically connecting the various linear chains, which undesired reaction side effects especially occur during the latter polymerization stages. The organic azo catalyst then has just the correct reactivity to polymerize unreacted monomer in preference to further polymerizing to a cross-linked state the already polymerized material. In any case, other free-radical producing catalysts have not been successful in overcoming this problem of polymerizing unreacted starting monomer to a high efficiency.

Likewise, when the polymerization was initiated by and run entirely in presence of azo catalyst during the whole of reaction, the polymer had a tendency to become gummy, thereby causing process difficulties. Also, the final polymeric products had substantially lower molecular weights than similar polymers prepared according to the techniques of the invention. It is thought that such is probably again due to the relatively low radical-producing strength of the azo catalyst, which characteristic effects formation of a greater number of smaller polymer chains rather than the desired lesser number of larger polymeric links. This property of low radical-producing strength in azo catalysts becomes a desirable characteristic only when such catalysts are employed as set out in the instant invention, and specifically as post-polymerization catalysts following pre-polymerization in presence of peroxy or redox type catalysts. An mentioned before the latter catalysts due to their relatively high strength in producing radicals, have the special attribute of causing free radical sites on already formed polymer chains, thereby increasing the average chain length to a maximum limit.

A preferred organic azo compound used in the post-polymerization reaction is a catalytic substance in which the azo, —N=N—, group is acyclic and has bonded to its component nitrogen atoms, "discrete" aliphatic or cyclo-aliphatic carbon atoms, at least one of which is tertiary in character. These carbon atoms are termed "discrete" since the azo group is acyclic and each of its nitrogen atoms is bonded to a different, separate or discrete carbon atom. No azo group nitrogen atoms are bonded to the same carbon atom. One of the carbon atoms bonded to the tertiary carbon has its remaining valences satisfied only by oxygen and/or nitrogen radicals. More preferred catalysts have two teritary carbons attached to the azo nitrogens and have negative groups as nitrile, carbalkoxy or carbonamide groups attached to the symmetrical tertiary carbons. The most preferred azo catalyst contains one cyano group bonded to each tertiary carbon, with the remaining valences of the tertiary carbon atoms being satisfied by hydrocarbon radicals.

Typical examples of azo catalysts used in the post-polymerization step may be chosen from alpha-(carbamyl-azo)-isobutyronitrile; alpha-(carbamylazo)-alpha-phenyl-propionitrile; alpha - (carbamylazo) - alpha - cyclopropyl-propionitrile; alpha-(carbamylazo)-alpha; gamma-dimeth-ylvaleramide; hexyl alpha-(carbamylazo)-alpha, gamma-dimethylvalerate; alpha, alpha' - azodiisobutyronitrile; alpha, alpha'-azobis (alpha, gamma-dimethylvaleroni-trile); alpha, alpha'-azobis (alpha-methylbutyronitrile); alpha, alpha'-azobis (alpha-cyclohexylpropionitrile); alpha, alpha'-azobis (alpha-isopropyl-beta-methylbutyroni-trile); alpha, alpha'-azobis (alpha-n-butyl-capronitrile); 1,1' - azobis, (3 - methylcyclopentane carbonitrile); 1,1'-azodicamphane carbonitrile; alpha, alpha'-azodiisobutyra-mide; alpha, alpha'-azobis (alpha-cyclopropylpropiona-mide); dimethyl 1,1'-azodicyclohexane-carboxylate; etc. Reference may be made to U.S. Patent 2,471,959 for other specific azo catalysts.

It has been determined that in order to produce polymers having below about 2% and more preferably below about 1% of a monomer contaminant, the most preferred technique is to combine a special pre-polymerization step with the post-polymerization step involving azo catalyst addition. This special polymerization technique will be more specifically described as follows. Polymers produced by this method have in addition to exceptional low monomer content, exceedingly high molecular weight, and a proportional excellent activity both as paper retention aids and as coagulants and the like.

Broadly speaking, the special pre-polymerization technique involves preparation of a highly concentrated monomer solution, addition thereto of an inert heat transfer solvent medium, which may be referred to as an organic solvent, and subsequent polymerization effected at relatively low temperatures. This polymerization is then followed by the post-polymerization step as outlined above. The pre-polymerization should be carried out under conditions of high agitation and in the presence of an anti-sticking agent, which acts to keep the formed polymer from agglomerating into an impractical and unusable mass. The monomer or monomers actually polymerize in a separate stratum within the above system in the presence of a surface active compound acting as the anti-sticking agent. If conditions are followed closely, granules of relatively small size may be obtained which are easily ground into a free-flowing white water-soluble powder, and are immediately ready for subsequent post-polymerization without further processing. More preferably, however, the aqueous reaction mixture containing polymer and unreacted monomer is further polymerized without isolation of solid and the azo catalyst is added directly to this reaction mass.

More specifically, an aqueous solution is prepared containing about 30% to about 80% by weight of at least one monomer, 20% to 70%; of water, and 0.003% to about 0.2% based on the weight of monomer present of a polymerization catalyst, such as potassium persulfate. The water solution is then added to or mixed with a water-insoluble, organic, heat transfer medium which preferably is capable of forming an azeotropic mixture with water. The above mixture should contain a minor amount of a surface active agent which prevents the polymer from sticking to the agitator or the walls of the vessel. The temperature of the system is raised to a desired point and the mixture is kept in motion by means of an agitator. Oxygen is removed from the system either by purging with an inert gas such as nitrogen or carbon dioxide, by applying a vacuum or by boiling the mixture. The initial polymerization step is initiated as soon as the oxygen is removed. If an emulsion is formed due to the presence of the surface active agent, the emulsion breaks and the polymerization is carried out in a separate layer. The organic heat transfer medium substantially surrounds the aqueous medium as the polymerization takes place. Vigorous agtitation is employed to continuously shear the polymer layer into particles which vary in diameter, for example, from about 1/64" to about 2" and more often from about 1/32" to 1/2".

In a specific embodiment in case solid polymer is to be isolated prior to the post-polymerization step, the temperature of the mixture is raised to its boiling point or maintained at the boiling point in the event polymerization was carried out at the boiling point of the mixture, and after the polymerization is completed, water is removed by azeotropic distillation. The boiling temperature, of course, varies in accordance with the particular organic heat transfer agent in the mixture. During the boiling off stage, the organic solvent preferably is condensed and returned to the mixture while the water is being trapped and removed. After from 60 to 100% of the water has been eliminated, the granules that have formed are separated from the solvent by filtration and are then, if desired, washed and air dried. These are then preferably dissolved in a liquid media and further polymerized via the azo catalyst post-polymerization technique.

It has been found that benzene, toluene, xylene, and ethylene dichloride are especially suitable for use in this special pre-polymerization process as well as carbon tetrachloride, tetra chloroethylene, and the like. Other comparable organic compounds, however, could be used without difficulty as long as they do not contain alcohol, aldehyde or ketone groups which would cause undesirable side reactions. The polymerization medium can also contain a non-azeotroping component with boiling point above the distilling temperature. The above materials may be termed organic solvents and are all water-insoluble, organic heat exchange materials which are considered inert in the practice of the invention. These organic substances serve as heat transfer media or heat dissipators by suspension of the aqueous monomer phase and subsequently formed polymeric product.

The catalysts that are employed in this just described special pre-polymerization process, include the same conventional peroxidic and redox type catalytic agents as are listed above. Preferred are potassium persulfate, hydrogen peroxide, t-butyl peroxide and ammonium persulfate. The amount of catalyst used in the process may vary according to ranges previously mentioned. A redox type catalytic system is extremely useful in this first polymerization step of the process of the invention.

As was pointed out above, a surface active agent should be added to the polymerization mixture in order to prevent the polymer from sticking to the walls of the reaction vessel and to the agitator. There are numerous compounds on the market which would perform satisfactorily in that capacity. Materials such as "Ethomid" S–15, O–15, and HT–15, which are ethylene oxide condensates of fatty acid amides, as well as "Arlacel 80" and "Span 80," which are sorbitan mono oleates, will serve adequately as anti-sticking agents as will sorbitan monostearate, sodium dodecyl benzene sulfonate, aluminum stearates, and aluminum oleates. Other anti-sticking agents include alkali metal and nitrogen-base soaps of higher fatty acids, such as potassium and sodium myristate, laurate, palmitate, oleate, stearate, ammonium stearate, etc., as well as the surface-active compounds of the cation-active variety such as salts of long-chain aliphatic amines and quaternary ammonium bases. Among these are lauryl amine hydrochloride, stearyl amine hydrochloride, palmityl amine hydrobromide. Other surface-active anti-sticking agents include any alkali metal or ammonium alkyl or alkylene sulfates or sulfonates in addition to those listed above, such as sodium and/or potassium lauryl sulfate, alkyl, aryl and alkylated aryl sulfonates, cetyl sulfonate, sulfonated turkey red oil, sulfonated mineral oils, sodium, potassium and ammonium isopropyl napthalene sulfonate, amine-substituted alcohols, sulfonated fatty esters and amides, the hydrochloride of diethyl aminoethyloleylamide, trimethylcetyl ammonium methyl sulfate, alkanesulfonic acids, alkali metal and ammonium salts of sulfonated long-chain hydrocarbons or sulfonated long-chain fatty acids such as sulfonated oleic acid and sodium, potassium and ammonium salts of sulfated cetyl alcohol.

Other anti-sticking agents which are non-ionic in nature but nevertheless have activity as surfactants which may be used include, among others, partial esters of polyhydric alcohols, saturated or unsaturated, fatty acids and preferably fatty acids containing at least 12 and more preferably from 12 to 18 carbon atoms, hexitans and hexitides such as those listed above and others as manitan monolaurate, monopalmitate, etc., or the mono esters of coconut oil fatty acids and the like products. Other examples of anti-sticking agents include pentaerythritol mono and dipalmitate, trimethylolpropane distearate, polyglycol dilaurate, glucose monostearate, polyglycol monooleate and the like. Other suitable nonionic anti-sticking agents that may be employed in the invention include polyethylene glycol ethers of sorbitan or manitan, monolaurate, monopalmitate, monooleate or monostearate. Other examples include the hydroxypolyoxyalkylene ethers of phenols, such as the reaction product of ethylene oxide and/or propylene oxide and phenol itself, bis-phenol-A, resorcinol, and the like, and mixtures thereof. Still other examples include di- and mono ethers of polyhydric compounds and particularly the polyalkylene glycols. Best preferred are the aryl and alkaryl polyethylene glycol ethers, such as phenyl polyethylene glycol mono ether, xylypolyethylene glycol mono ether, alkyl phenyl polyalkylene glycol ethers, such as nonyl phenyl polyethylene glycol ether, and the like.

Initially, in the beginning of this special prepolymerization process, the presence of the surface active agent may cause the formation of an emulsion. It is essential, however, that the emulsion break and form two separate and distinct layers prior to the polymerization reaction. The surface active agent which is added to the system can vary from about 0.05% to about 7.0% weight based on the weight of the heat transfer medium, and preferably will vary from about 0.1% to about 2% by weight. During the polymerization, the monomer-containing aqueous medium is substantially surrounded by the organic heat transfer medium. Too large a quantity of the surface active agent should be avoided inasmuch as an excess might tend to form stable emulsions or suspensions. The surface active agent's function is primarily to prevent the forming polymer from sticking to either the agitator or walls of the reaction vessel.

It is preferred to dissolve the catalyst and the activator in separate water solutions prior to adding to the aqueous solutions the monomer or monomers. Also the catalyst and activator can be dissolved in the aqueous monomer solution just prior to adding this solution to the organic heat transfer agent. Alternatively, the catalyst can be dissolved in a small amount of water and then be added to the organic heat transfer medium prior to the addition of the monomeric solution. Another satisfactory method would be to dissolve the catalyst and/or activator in water and add this solution to the reaction mixture after the monomeric solution has been added to the heat transfer medium. If a solid is to be first produced prior to further polymerization with the azo catalyst, a single azeotropic distillation is carried out upon the mixture of polymer and unreacted monomer, leaving behind the solid mixture.

If solid products are devised as reactants in the azo post-polymerization, the water content of the polymers that are produced by the above method should range from 0 to about 28%. A more preferred water content range is from about 5% to 15%. If the moisture content of the polymer is greater than about 28%, the solid granules tend to agglomerate and are difficultly soluble for subsequent dissolution and reaction. Likewise, such azeotropic technique may be easily carried out in the same manner after the post-polymerization step has been effected whereby solid polymers are obtained.

Several organic relatively water-insoluble heat transfer liquids have been suggested above which can be used in this special process. It is preferred that those liquids form azeotropic mixtures with water. By azeotropic mixtures, we mean mixtures which on heating will cause water to distill over at temperatures generally below the normal boiling point of both the water and the other organic component at a given pressure. The use of an azeotropic mixture makes it possible to remove water from the polymer particles subsequent or prior to the second stage of the overall process or the post-polymerization step, without employing special drying equipment. Apart from the fact that these liquids must not contain reactive groups such as alcohol, aldehyde, and ketone groups, which would cause side reactions, the selection of the particular heat transfer medium is not particularly critical. Toluene and benzene are relatively inexpensive materials and have been found to provide excellent results. For this reason, they are preferred heat transfer agents.

As was pointed out above, the heat transfer medium plays an important part in the concentrated solution polymerization method. In particular, the function of the organic liquid is to remove the heat of reaction from the forming polymer.

One of the important steps of the polymerization process involves the removal of dissolved oxygen gas from the reaction mixture. The removal of the oxygen can be accomplished by (1) purging the reaction mixture with an inert gas such as nitrogen or carbon dioxide, (2) boiling the reaction mixture, and (3) applying a partial vacuum to the system. If an inert gas is used to remove the oxygen, it is best applied by passing the gas through a disperser or sparger which is inserted beneath the surface of the reaction mixture.

One of the major disadvantages of the prior art methods is that only dilute solutions of monomers could be polymerized without causing a violent reaction or without producing a rubbery, non-flowable material. In the above special process, the total monomer content of the aqueous solution can range from about 30% to about 80% by weight. Primarily because it is possible to work with concentrated solution of monomer, the formed polymers have unusual and highly advantageous properties.

The above just discussed polymerization process comprising a special technique used in the first stage of the overall process of the invention, specifically involving use of water-insoluble organic heat transfer medium, catalyst and surface-active anti-sticking agent, may be employed in polymerization of any one or more ethylenically unsaturated water-soluble monomer. It has found particular use in synthesizing a special group of terpolymers. These latter materials have exceedingly high molecular weight, but nevertheless have excellent water-solubility. Their speed of dissolution is particularly advantageous in many areas such as paper treatment and coagulation. In formation of these terpolymers an aqueous solution containing from about 30% to about 80% by weight of acrylamide, a polymerizable polycarboxylic acid selected from the group consisting of maleic acid, maleic anhydride and fumaric acid and an ethylenically unsaturated water-soluble monomer is first prepared. Then the initial stage of polymerization is carried out followed by immediate further polymerization via the post-polymerization technique. An ethylenically unsaturated water-soluble monomer may be any one or more of the type as specifically referred to above. In making up the terpolymer it is preferred to use from 85–95 parts by weight of acrylamide and more preferably from 98.45 to 94.5 parts by weight. The polycarboxylic acid comprises from 0.3 to 2.0 parts by weight and more preferably from 0.5 to 1.5 parts by weight of the total weight of the three monomers. The last monomeric reactant may comprise from 3.0 to 15.0% parts by weight of the total composition and most preferably 5.0 to 9.0 parts. Again, such terpolymers may be isolated in the solid form prior to initiation of the last stage of the polymerization in presence of azo catalyst. It is preferred, however, that the process be carried out in one continuous step and the azo catalyst be added after the first stage of the polymerization has been terminated as measured by a completion of at least one-half of the exothermic reaction.

Terpolymers synthesized by the above specially outlined first stage of the polymerization followed by further polymerization via the azo catalyst route have monomer content below 2.0% by weight of the original monomer present, and can easily be so synthesized through the process of the invention whereby their monomer content is substantially below 1.0% by weight. Such terpolymer substances show substantially no toxicity, and have exceptional ability in retaining inorganic fillers and fiber fines on a paper pulp network. In view of substantially complete absence of unreacted monomer, effective utilization of the polymeric paper additive is achieved. Particularly there is no shipment of undesired monomer, and is no chance for interference of additive activity by unreacted monomer which in prior art polymerization methods remains in intimate contact with the formed polymer and is carried through to the treatment area.

The following examples illustrate the process of the invention and in particular the advantages realized through reduction of monomer content by a post-polymerization reaction step initiated by an azo catalyst. It is understood that these examples are illustrative and that the invention is not limited thereto.

EXAMPLE I

This example illustrates the process of the invention and particularly involves terpolymerization of maleic anhydride, methacrylic acid and acrylamide using the special preparative techniques of the first stage of polymerization as set forth above using a redox system of polymerization and a high concentration of monomers, followed by further polymerization by means of an azo catalyst. Unless otherwise indicated, the percentage figures below are to be taken as percent by weight.

To 108.0 grams of water are added 1.125 grams of maleic anhydride, 9.4 grams of methacrylic acid and 10.0 grams of a 50% concentrated aqueous solution of sodium hydroxide. The above ingredients are mixed until complete solubilization is effected. 124.425 grams of acrylamide are added to the above mixture and the entire solution is gently agitated and mildly heated at a temperature not greater than 38° C. It is preferred that the temperature not exceed the above figure since heating at a higher temperature would effect polymerization prematurely. The pH of the solution is then adjusted with 50% caustic sufficient to raise the pH to 9.0.

In a separate 3000 ml. three-necked flask, equipped with thermometer, Dean and Stark trap, condenser, stirring device and heating mantle attached to a variable transformer, are added 753.0 grams of toluene and 0.14 grams of a petroleum sulfonate anti-sticking agent. The reaction flask then is purged with nitrogen at a rate of 960 cc. min. After the inert solvent and anti-sticking agent mixture is purged sufficiently, the above basic monomeric solution is added to the 3000 cc. reaction flask. The system is put under vacuum (8 inches) and heated to 70° C. After this temperature is reached, the vacuum is shut off and 4.8 grams of a 1% aqueous solution of $Na_2S_2O_5$ is added while the stirring mechanism is running. After a few seconds, 1.2 grams of a 1% aqueous solution of $K_2S_2O_8$ is added. During this addition of redox reagent, the reaction temperature drops two to three degrees centigrade. The redox catalyst is completely added, the vacuum is reestablished at an 8″ reading, and the reaction mass reheated to 70° C. When this temperature is again reached the vacuum is shut off and only nitrogen is introduced into the reaction mixture for the duration of the reaction time. Heating is applied in order to maintain the reaction mass at 70° C., until an exotherm occurs. At that time, heat is discontinued and cooling applied until the temperature drops of its own accord to 68° C.

After the exothermic reaction has been completed, temperature of the mixture of the polymerization reaction is maintained at 70° C., for 30 minutes. After this time has elapsed 0.27 gram of alpha, alpha' azobis isobutyronitrile is added to the reaction mass. The post-polymerization reaction step is then carried out for 30 minutes at a temperature of approximately 70° C. Prior to this post-polymerization step the monomer content was about 2.9% as measured by a titration with bromine. Subsequent to polymerization with the azo catalyst, the free monomer content dropped to 0.2%, the latter figure being considered almost negligible.

After the post-polymerization reaction has been completed, azeotropic distillation begins. Approximately 90% of the total water added was azeotroped off. Filtration from the organic solvent left a white granular product, substantially all composed of terpolymer.

The above experiment graphically illustrates that via the polymerization process of the invention, excellent water-soluble polymers may be produced having a substantially reduced monomer content and in most cases almost negligible in amount. Similar experiment involving use of other post-polymerization catalysts such as of the peroxide type, were unsuccessful in reducing unreacted monomer content below about 2.0% and/or resulted in production of gelled unusable material.

EXAMPLE II

To a 500 ml. breaker were added 85.5 grams acrylamide, 4.0 grams of methacrylic acid, 0.5 gram of maleic anhydride, and 72 mls. of distilled water. The monomeric solution was stirred and the pH was adjusted from 3.2 to 6.3 with 50% concentrated sodium hydroxide. With gentle stirring 0.8 mls. of a 1% aqueous solution of $K_2S_2O_8$ and 3.2 mls. of a 1% aqueous solution of $Na_2S_2O_5$ were added to the above monomeric solution. In a separate 1000 ml. reaction flask the inert organic solution comprising the heat transfer media and anti-sticking agent were prepared. This solvent solution contained 574 grams of toluene and 0.2 gram of petroleum sulfonate. After heating the inert solvent solution to 71° C., with stirring, the monomeric aqueous solution was added slowly to the reaction flask. The temperature during the addition then dropped to 55° C., whereupon the entire mixture was reheated to 75° C. At this time, a 8″ vacuum was applied and a nitrogen layer was put over the reaction surface. The temperature was maintained at 75° C., for 26 minutes, after which time a phase separation was noted. During this time, a vacuum was continuously applied and nitrogen flowed over the reaction surface. After the temperature had dropped to about 74° C., the water was removed by azeotropic distillation. 72 ml. of water was removed by this method. The resultant white free-flowing granules were washed and separated by vacuum filtration, and ground to below 40 mesh.

An aqueous solution was prepared composed of 135 grams of the above solid granules in 110 ml. of water and mixed for one hour. After this time lapse, the solution was heated to 70° C., and 27 ml. of a 1% methanolic solution of alpha, alpha' azobis isobutyronitrile was added thereto. The post-polymerization step was then continued at this temperature for 30 minutes. This latter step had the effect of reducing free monomer content of the solid material from 5% down to 0.2%. The post-polymerization reaction itself was carried out in the presence of nitrogen throughout the whole of reaction time.

EXAMPLE III

This example was performed using the general technique outlined in Example I with minor variations in the amounts and ratios of the monomers, heat transfer media, and anti-sticking agent.

Again, the aqueous monomeric system was formulated by adding 1.12 grams of maleic anhydride, 9.45 grams of methacrylic acid, and 124.43 grams of acrylamide to 110 mls. of distilled water. The pH was adjusted in this experiment to 9.0 with 50% concentrated sodium hydroxide. In a separate reaction flask, the organic inert solvent system was prepared by adding 0.28 gram of a petroleum sulfonate to 683 mls. of toluene. The monomeric aqueous solution was added to the solvent system with stirring, nitrogen continuously run through the system, and vacuum applied to give 22 inches (gauge) pressure. Heat was then applied and the temperature raised to 60° C. Heat was momentarily removed, the vacuum was broken and 2.4 mls. of 1% aqueous solution of $Na_2S_2O_5$ solution and 0.6 mls. of a 1% aqueous $K_2S_2O_8$ solution previously diluted to 10 mls., were added to the reaction mixture. The vacuum system was resealed and the temperature adjusted to 60° C. After the temperature was reached, the vacuum was broken slowly over a period of about 30 seconds. Then the temperature of the reaction was held between 58° C., and 62° C. The exothermic reaction occurred ten minutes after addition of the catalyst and redox activator. In this run, the duration of the exothermic reaction was 41 minutes.

Immediately after the exothermic reaction had been completed 0.27 gram of alpha, alpha' azobis isobutyronitrile in a solution of toluene was added thereto and the post-polymerization reaction carried out as in Example I. Again the free monomer content in the product was reduced to an exceptionally low level, and in this case to about 0.2% by weight based on the weight of the original monomer present as reactant material.

EXAMPLE IV

In this example, fumaric acid was substituted for maleic anhydride employed in the previous examples.

1.12 grams of fumaric acid, 9.45 grams of methacrylic acid, and 124.43 grams of acrylamide were dissolved in 110 mls. of distilled water and the pH then adjusted to 9.0 with 50% concentrated aqueous sodium hydroxide solution. The organic solvent system was prepared by adding 0.17 gram of petroleum sulfonate to 630 mls. of toluene. The monomeric solution was added to the organic solvent system, with stirring, the reaction flask sealed, and nitrogen introduced for a few seconds through a nitrogen disperser. The vacuum was then applied (22 inches gauge pressure), and heat applied until the temperature reached 70° C. The heating mantle was removed temporarily, the vacuum system broken, and 4.8 mls. of 1% $K_2S_2O_8$, previously diluted to 10 ml. with distilled water, were added. The system was resealed and the temperature adjusted to 70° C., after which time the vacuum was broken slowly over a period of 30 seconds.

The temperature of the reaction was held between 69° C. and 71.5° C. Twelve minutes after the introduction of the catalyst and redox activator, a phase separation occurred and the exothermic reaction began. This reaction lasted for a total of 18 minutes. The post-polymerization reaction was then completed as outlined in Example I, with the same resulting low monomer content in the final product.

EXAMPLE V

To a 1,000 ml. 3-necked, round bottom flask, fitted with stirrer, thermometer and Dean and Starke trap connected to a condenser was added 100 ml. of tetrachloroethylene, 400 ml. of benzene and 24 g. of Ethomid O–15, surface active agent. This solution is designated as Solution A. A second solution "B" was prepared by mixing 67.5 g. of acrylamide, 6 g. of urea and 54 g. of distilled water in a stainless steel beaker. This mixture was heated to 50° C., to dissolve the solids, after which time 1.2 ml. of 1% potassium persulfate solution was added with stirring. The resultant solution was then held for four minutes at a temperature of 50–52° C., to activate the catalyst.

Solution B was then added to Solution A with mild agitation. Initially, an emulsion was formed of the two solutions. The temperature was raised to 76° C., at which point benzene and water began to distill off from the mixture causing the mixture to be purged of oxygen. The emulsion broke thereafter to yield a separate water layer and an organic layer, whereupon the acrylamide polymerized with evolution of heat in the aqueous medium which was surrounded by the benzene which acted as a heat transfer agent. Agitation of the mixture was increased at this time in order to shear the polymer into particles.

At this point, sufficient alpha, alpha' azobis isobutyronitrile was added so that its amount calculated on the basis of original monomer content was 0.2%. The post-polymerization step was then carried out in the presence of azo catalyst for a period of 20 minutes at 75° C. After this step was accomplished, water was removed by azeotropic distillation. The resultant granules having a low monomer content were forced from the solvent by filtration washed with fresh benzene and air dried.

Four other runs similar to the above acrylamide polymerization were also carried out and, in each case, the unreacted monomer content was lowered due to the effect of the azo catalyst. Also, it was noted that when the post-polymerization step was omitted, solutions containing 1.33% by weight of polymer had a tendency upon long-term standing to gel. On the other hand, when the azo catalyst run was carried out, no gelation occurred in dilute aqueous solutions of resultant polymer.

The same type procedure of Example V was followed in preparing polymers starting from two separate mixtures of 60% acrylamide and 40% acrylic acid and 30% acrylamide and 70% acrylic acid. Again, carrying out the post-polymerization step in these two runs, helped to produce polymers which, while having an exceptionally high viscosity, did not set up to a gel in an aqueous medium even upon long-term standing.

A series of 38 separate experiments were taken carried out according to the general procedure outlined in Example I. The catalyst in each case was potassium persulfate and the activator sodium thiosulfite. Amounts of these two ingredients were varied from process to process. Likewise, the amount of azo post-polymerization catalyst varied over a wide range. Table I shows these variations in experimental work and also shows free monomer content in products with and without the benefit of the post-polymerization technique outlined above. Post-polymerization catalyst is labeled "post catalyst" in the table. It is readily apparent from inspection of Table I that all products from these processes having a post-polymerization reaction step had a free monomer content below 2.0% by weight and the vast majority below 1.0%. On the other hand, those products formed from processes in which this post-polymerization step was omitted had relatively high monomer content. While products having such high monomer content may well be acceptable in many areas, nevertheless, it is exceptionally beneficial to have substantially all polymeric products with little or no monomer contaminant present. This is particularly true when the monomer itself is either totally ineffective in an additive role in which the polymeric agent is, on the other hand, extremely effective. At the very least the monomer acts as an unnecessary diluent.

TABLE I

| Batch No. | Redox catalyst amount ml., 1% solution | | Post catalyst, wt. percent based on monomer | Product viscosity, cps., 1% solution | Free monomer content in product |
|---|---|---|---|---|---|
| | Catalyst | Activator | | | |
| 1 | 1.2 | 4.8 | .02 | 735 | 0.9 |
| 2 | 1.2 | 4.8 | .02 | 830 | 0.7 |
| 3 | 1.2 | 4.8 | .02 | 775 | 0.6 |
| 4 | 1.2 | 4.8 | .02 | 630 | 1.3 |
| 5 | 1.2 | 4.8 | .05 | 800 | 0.2 |
| 6 | 1.2 | 4.8 | .1 | 1875 | 0.2 |
| 7 | 1.2 | 4.8 | .1 | 265 | [1] 1.3 |
| 8 | 1.2 | 4.8 | .1 | 660 | 0.25 |
| 9 | 4.8 | 1.2 | .01 | 715 | 1.3 |
| 10 | 4.8 | 1.2 | .02 | | 0.7 |
| 11 | 4.8 | 1.2 | .02 | 835 | 0.4 |
| 12 | 4.8 | 1.2 | .02 | 375 | 0.7 |
| 13 | 4.8 | 1.2 | .02 | 315 | 1.1 |
| 14 | 4.8 | 1.2 | .02 | 720 | 0.7 |
| 15 | 1.2 | 4.8 | .2 | 725 | 0.1 |
| 16 | 1.2 | 4.8 | .2 | 675 | 0.25 |
| 17 | 1.2 | 4.8 | .2 | 695 | 0.32 |
| 18 | 1.2 | 4.8 | .4 | 775 | 0.2 |
| 19 | 2.0 | | .05 | 650 | 0.2 |
| 20 | 2.0 | | .1 | 750 | 0.3 |
| 21 | 2.0 | | .2 | 718 | 0.3 |
| 22 | 2.0 | | .2 | 710 | 0.3 |
| 23 | 1.0 | | .2 | 805 | 0.3 |
| 24 | 1.2 | 4.8 | .2 | 135 | [2] 0.5 |
| 25 | 1.2 | 4.8 | | 670 | 4.1 |
| 26 | 1.2 | 4.8 | | 670 | 4.1 |
| 27 | 1.2 | 4.8 | | 395 | 8.4 |
| 28 | 1.2 | 4.8 | | 510 | 4.9 |
| 29 | 1.5 | 6.0 | | 625 | 3.5 |
| 30 | 1.8 | 7.2 | | 530 | 2.9 |
| 31 | 1.8 | 7.2 | | 570 | 2.9 |
| 32 | 1.8 | 7.2 | | 585 | 2.7 |
| 33 | 1.8 | 7.2 | | 735 | 2.7 |
| 34 | 1.8 | 4.8 | | 765 | 2.8 |
| 35 | 1.2 | 4.8 | | 402 | 10.7 |
| 36 | 1.2 | 4.8 | | 640 | 2.6 |
| 37 | 1.2 | 4.8 | | 590 | 4.1 |
| 38 | 1.2 | 4.8 | | 703 | 2.6 |

[1] Monomer content before azo catalyst addition, 13.2%.
[2] Isolated solid polymer (5.6% monomer content) prior to postpolymerization step.

Obviously, many modifications and variations of the invention as hereinbefore set forth may be made without departing from spirit and scope thereof, and therefore only such limitations should be imposed as are indicated in the appended claims.

The invention is hereby claimed as follows:

1. In a batch polymerization method where the monomer compositions are only added at the initiation of the polymerization reaction, which comprises the steps of adding a free radical-producing catalyst selected from the group consisting of peroxidic and redox catalysts to a solution containing at least one water-dispersible monomer having an ethylenically unsaturated group and containing in a side chain, a hydrophilic group from the class consisting of carboxylic acid, carboxylic acid anhydride, carboxylic acid amide, hydroxy, pyridine, pyrrolidone, hydroxy alkyl ether, alkoxy, and carboxylic acid salt groups, said monomer being capable of addition polymerization, and allowing polymerization of said monomer to occur in the presence of said catalyst; the improvement which comprises addition to the partially polymerized monomer of at least a catalytic amount of an organic azo compound containing an acyclic azo group having bonded to each nitrogen a discrete carbon atom of the class consisting of aliphatic and cycloaliphatic carbon atoms, at least one of said discrete carbon atoms being tertiary and one of the carbon atoms bonded to said tertiary carbon atom having its remaining valences satisfied only by the elements selected from the group consisting of oxygen and nitrogen, said addition being carried out at a time when at least one-half of the exotherm of said polymerization reaction has occurred, said carrying out a post-polymerization reaction step in presence of said azo catalyst whereby at the termination of said reaction step unreacted starting monomer content is substantially reduced.

2. The method of claim 1 wherein said azo catalyst has bonded to each nitrogen atom a discrete tertiary aliphatic atom having bonded thereto one cyano group, the remaining valences of said tertiary carbon atom being satisfied by hydrocarbon radicals, said catalyst being added in an amount of at least 0.001% based on the weight of the original monomer content.

3. The method of claim 1 wherein said post-polymerization reaction is carried out for at least ¼ hour at a temperature of at least 30° C.

4. The method of claim 1 wherein said azo catalyst is added to said partially polymerized monomer at a time when the exotherm of said initial polymerization reaction has terminated.

5. The method of claim 4 wherein said partially polymerized monomer is isolated as a solid subsequent to the initial polymerization, and then said azo catalyst is added to said isolated partially polymerized monomer and said post-polymerization reaction step is carried out.

6. The method of claim 4 wherein said post-polymerization reaction step is carried out in the presence of an inert gas.

7. An improved batch polymerization process where the monomer compositions are only added at the initiation of the polymerization reaction, which comprises the steps of forming a reaction mixture consisting of (1) an aqueous solution containing from about 30% to about 80% by weight of at least one ethylenically unsaturated, water-soluble monomer, (2) a water-insoluble organic heat transfer medium, (3) from about 0.003% to about 0.2% by weight of a polymerization catalyst, based on the weight of said monomer, and (4) a surface-active anti-sticking agent, raising the temperature of said mixture to a predetermined point and thereafter removing the dissolved oxygen from said reaction mixture which is surrounded by said heat transfer medium, and whereby said monomer is partially polymerized within said aqueous layer; adding an organic azo catalyst to the partially polymerized monomer when at least ½ of the exotherm of said polymerization reaction step in presence of said azo catalyst whereby at the termination of said reaction step unreacted starting monomer content is substantially reduced.

8. The method of claim 7 wherein said azo catalyst is an aliphatic azo compound containing an acyclic azo group having bonded to each nitrogen atom a discrete tertiary aliphatic carbon atom having bonded thereto one cyano group, the remaining valences of said tertiary carbon atom being satisfied by hydrocarbon radicals, said azo catalyst being added in an amount of at least 0.001% based on the weight of said monomer.

9. The method of claim 7 wherein said post-polymerization reaction is carried out for a period of at least ¼ hour at a temperature of at least 30° C.

10. The method of claim 7 wherein said azo catalyst is added to said partially polymerized monomer at a time when at least the exotherm of said initial polymerization reaction has terminated.

11. The method of claim 10 wherein said initial and said post-polymerization reaction are carried out in the presence of an inert gas.

12. An improved batch polymerization process where the monomer compositions are only added at the initiation of the polymerization reaction, which comprises forming a reaction mixture of (1) an aqueous solution containing from about 30% to about 80% by weight of acrylamide, a polymerizable polycarboxylic acid selected from the group consisting of maleic acid, maleic anhydride, and fumaric acid and an ethylenically unsaturated water-soluble monomer, (2) a water-insoluble organic heat transfer medium, (3) from about 0.003% to about 0.2% by weight, based on the weight of said monomers, of a polymerization catalyst selected from the group consisting of peroxidic and redox catalysts, and (4) a surface-active anti-sticking agent; raising the temperature to a predetermined point; and thereafter removing the dissolved oxygen from said reaction mixture whereby a distinct aqueous liquid is formed within said reaction mixture which is surrounded by said heat transfer medium, and whereby said monomers are partially terpolymerized within aqueous layer; adding to said partially polymerized terpolymer at least a catalytic amount of an organic azo compound containing an acyclic azo group having bonded to each nitrogen atom a discrete carbon atom of the class consisting of aliphatic and cyclo aliphatic carbon atoms, at least one of said discrete atoms being tertiary and one of the carbon atoms bonded to said tertiary carbon atom having its remaining valences satisfied only by elements selected from the group consisting of oxygen and nitrogen, said azo catalyst being added to said partially polymerized terpolymer at a time when at least ½ of the exotherm of said initial polymerization reaction has occurred, and carrying out a post-polymerization reaction step in presence of said azo catalyst whereby at the termination of said post-polymerization reaction step unreacted starting monomer content is substantially reduced.

13. The method of claim 12 wherein said catalyst is alpha, alpha'-azobis isobutyronitrile, said catalyst being added in an amount of from 0.001% to 1.0% by weight based on the weight of said starting monomer content.

14. The method of claim 12 wherein said post-polymerization reaction is carried out for a period of at least ¼ hour at a temperature of at least 30° C.

15. The method of claim 12 wherein said azo catalyst is added to said partially polymerized terpolymer at a time when the exotherm of said initial polymerization reaction has terminated.

16. In a batch polymerization method where the monomer compositions are only added at the initiation of the polymerization reaction, which comprises the steps of adding a free radical-producing catalyst to at least one monomer having an ethylenically unsaturated group and containing in a side chain, a hydrophilic group selected from the class consisting of carboxylic acid, carboxylic acid anhydride, carboxylic acid amide, hydroxy, pyridine, pyrrolidone, hydroxy alkyl ether, alkoxy, and carboxylic acid salt groups, said monomer being capable of addition polymerization and allowing polymerization of said monomer to occur in presence of said catalyst; the improvement which comprises addition of an organic azo catalyst to the partially polymerized monomer at a time when at least ½ of the exotherm of said polymerization reaction has occurred, and carrying out a post-polymerization reaction step in presence of said azo catalyst whereby at the termination of said post-polymerization reaction step unreacted starting monomer content is substantially reduced.

References Cited

UNITED STATES PATENTS

| | | | |
|---|---|---|---|
| 3,211,708 | 10/1965 | Zimmermann et al. | 260—78.5 |
| 2,656,334 | 10/1953 | D'Alelio | 260—78.5 |
| 3,218,302 | 11/1965 | Melamed | 260—86.1 |
| 3,013,305 | 12/1961 | Tillington | 260—86.1 |

FOREIGN PATENTS

| | | |
|---|---|---|
| 230,397 | 9/1960 | Australia. |
| 915,240 | 1/1963 | Great Britain. |

JOSEPH L. SCHOFER, *Primary Examiner.*

J. KIGHT, *Assistant Examiner.*